(12) United States Patent
Forutanpour et al.

(10) Patent No.: US 8,385,975 B2
(45) Date of Patent: Feb. 26, 2013

(54) CONTEXT-BASED MESSAGING FOR WIRELESS COMMUNICATION

(75) Inventors: Babak Forutanpour, Carlsbad, CA (US); Homayoun Shahri, Dana Point, CA (US)

(73) Assignee: QUALCOMM Incorporated, San Diego, CA (US)

( * ) Notice: Subject to any disclaimer, the term of this patent is extended or adjusted under 35 U.S.C. 154(b) by 618 days.

(21) Appl. No.: 12/429,088

(22) Filed: Apr. 23, 2009

(65) Prior Publication Data

US 2010/0273443 A1 Oct. 28, 2010

(51) Int. Cl.
*H04B 1/38* (2006.01)
(52) U.S. Cl. .................. 455/558; 455/415; 455/418
(58) Field of Classification Search .................. 455/558, 455/561, 567, 566, 559
See application file for complete search history.

(56) References Cited

U.S. PATENT DOCUMENTS

| 7,177,402 | B2* | 2/2007 | Metcalf .................. 379/88.03 |
| 2002/0090069 | A1 | 7/2002 | Yaker |
| 2002/0154752 | A1 | 10/2002 | Carpenter |
| 2004/0127263 | A1* | 7/2004 | Vegh .......................... 455/567 |
| 2005/0181846 | A1* | 8/2005 | Taneya et al. ............... 455/575.3 |
| 2006/0031470 | A1 | 2/2006 | Chen et al. |
| 2007/0022075 | A1 | 1/2007 | Horvitz et al. |
| 2008/0056454 | A1* | 3/2008 | Lahtiranta et al. ........... 379/67.1 |
| 2008/0318562 | A1* | 12/2008 | Featherstone et al. ........ 455/418 |
| 2009/0061833 | A1* | 3/2009 | Ho et al. .................... 455/414.2 |
| 2009/0215479 | A1* | 8/2009 | Karmarkar .................. 455/466 |

FOREIGN PATENT DOCUMENTS

| EP | 1819137 A1 | 8/2007 |
| EP | 1924066 A2 | 5/2008 |
| WO | WO2008021838 A2 | 2/2008 |
| WO | WO2008116047 | 9/2008 |

OTHER PUBLICATIONS

International Search Report and Written Opinion—PCT/US2010/032195, International Search Authority—European Patent Office—Jul. 20, 2010.

* cited by examiner

*Primary Examiner* — Peguy Jean Pierre
(74) *Attorney, Agent, or Firm* — Brent Boyd

(57) ABSTRACT

This disclosure describes techniques for providing a wireless communication device with context-based voicemail messaging. In reply to a call, a wireless communication device may select a message based on a context. As an example, a wireless communication system may detect a call directed to a wireless communication device from a caller, generate one of a plurality of reply messages for the caller based on a context of the wireless communication device derived from input information received by at least one input of the wireless communication device, and transmit the generated reply message to the caller. In some cases, the message may be selected based on both context and caller identity. In addition, the message may be selected based at least in part on analysis of a pattern of usage or user activity with respect to the wireless communication device.

53 Claims, 9 Drawing Sheets

CONTEXT-BASED MESSAGING FOR WIRELESS COMMUNICATION

TECHNICAL FIELD

The disclosure relates to wireless communication devices and, more particularly, messaging techniques for wireless communication devices.

BACKGROUND

Many wireless communication devices include features such as voicemail messaging. Voicemail messaging is typically activated for a caller when a wireless communication device user does not answer a call, e.g., when the user is on another call, out of range, ignores a call, or is not otherwise available. When voicemail messaging has been activated, a voicemail messaging system typically plays a voicemail greeting for the caller, and the caller is forwarded to a portion of the voicemail messaging system that allows the caller to leave a voice message for the user.

Often, a caller may continue to call the wireless communication device, despite having previously reached the voicemail messaging system, believing that the user is available to talk but is simply overlooking or ignoring the call. Or, people may call the wireless communication device every few minutes, despite having left a message earlier. These callers may believe that their call should have been returned already or that the user may be available to talk now that a few minutes have elapsed. Of course, there may be a number of reasons why the user has not been able to answer or return the call.

SUMMARY

In general, this disclosure describes techniques for providing a wireless communication device with context-based voicemail messaging. In reply to a call, a wireless communication device may select a message based on a context. As an example, a wireless communication system may detect a call directed to a wireless communication device from a caller, generate one of a plurality of reply messages for the caller based on a context of the wireless communication device derived from input information received by at least one input of the wireless communication device, and transmit the generated reply message to the caller. In some cases, the message may be selected based on both context and caller identity.

In one example, the disclosure provides a method comprising detecting a call directed to a wireless communication device from a caller, generating one of a plurality of reply messages for the caller based on a context of the wireless communication device derived from input information received by at least one input of the wireless communication device, and transmitting the generated reply message to the caller.

In another example, the disclosure provides a wireless communications system comprising a wireless communication device having an input interface that generates input information indicating a context of the wireless communication device, a processor that detects a call directed to the wireless communication device from a caller, and generates one of a plurality of reply messages for the caller based on the context of the wireless communication device, and a transmitter that transmits the generated reply message to the caller.

In another example, the disclosure provides a wireless communication device comprising an input interface that generates input information indicating a context of the wireless communication device, and a processor that detects a call directed to the wireless communication device from a caller and generates an indication for generation of one of a plurality of reply messages for the caller based on the context of the wireless communication device.

In another example, the disclosure provides a computer-readable medium comprising instructions that cause a processor within a wireless communication system device to detect a call directed to a wireless communication device from a caller, generate one of a plurality of reply messages for the caller based on a context of the wireless communication device derived from input information received by at least one input of the wireless communication device, and transmit the generated reply message to the caller.

In another example, the disclosure provides a wireless communications system comprising means for detecting a call directed to a wireless communication device from a caller, means for generating one of a plurality of reply messages for the caller based on a context of the wireless communication device derived from input information received by at least one input of the wireless communication device, and means for transmitting the generated reply message to the caller.

The details of one or more examples of the disclosure are set forth in the accompanying drawings and the description below. Other features, objects, and advantages will be apparent from the description and drawings, and from the claims

DETAILED DESCRIPTION

Figure 1:
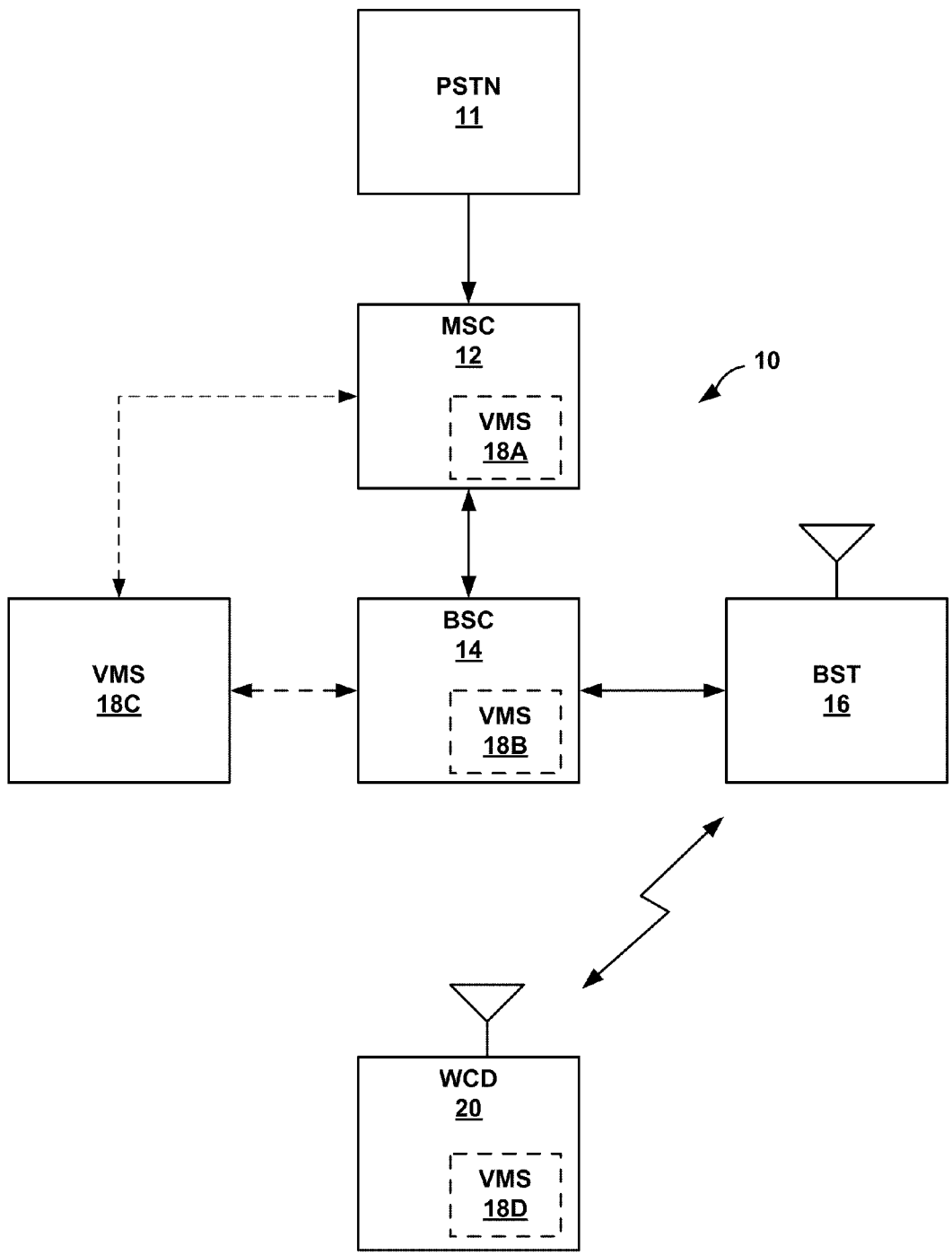
FIG. 1 is a block diagram of a wireless communication system.

FIG. 1 is a block diagram of a portion of wireless communication system 10. As seen in FIG. 1, system 10 includes public switched telephone network (PSTN) 11, mobile switching center (MSC) 12, base station controller (BSC) 14, base station transceiver (BST) 16, a voicemail messaging system (VMS) shown in several configurations as VMS 18A-18D, and wireless communication device (WCD) 20. WCD 20 may support any of a variety of telephony services, such as voice, video, or data services. When a caller calls WCD 20, MSC 12 receives the call and determines the cell in which WCD 20 is located. MSC 12 may maintain a lookup table based on the signal strength information of WCD 20, as received by MSC 12 from BSC 14 for BST 16. After determining where WCD 20 is located, MSC 12 directs calls to WCD 20 via BST 16. MSC 12, BSC 14, and WCD 20 may be referred to as wireless communication system devices.

WCD 20 typically includes several codes that are used by system 10, including a system identification code (SID). The SID is a number programmed into the wireless communication device that identifies the device's home network. The SID is broadcast by the wireless communication device on its control channel and compared by the network to its own identification code in order to determine whether the wireless communication device is roaming, often for billing purposes.

As mentioned above, system 10 includes a VMS which may be configured within system 10 in several different ways. In some cases, the VMS may reside within MSC 12 (VMS 18A) or BSC 14 (VMS 18B). In other cases, the VMS may be directly coupled to either or both MSC 12 and BSC 14 (VMS 18C), as represented by the dashed lines between MSC 12, BSC 14, and VMS 18C in FIG. 1. In some cases, the VMS may reside within WCD 20 (VMS 18D) such that when a caller calls WCD 20, WCD 20 performs all voice messaging tasks including encoding, decoding, and voice messaging data storage. From now on, VMS 18A-18D will be referred to generally as VMS 18, with specific configurations described as needed.

In the event that a caller is unable to reach WCD 20 because the wireless communication device has been powered off, is out of range, or the caller reaches the wireless communication device and the wireless communication device user does not answer, or for any other reason, depending upon the configuration of system 10, either MSC 12, BSC 14, or WCD 20 transfers the caller to VMS 18. VMS 18 may encode and store a message for the wireless communication device user, or store an already encoded message, and then notify the user that a message has been received. VMS 18 as it relates to aspects of the disclosure will be described in more detail below.

Prior to recording and storing the message from the caller, VMS 18 typically plays a pre-recorded greeting to the caller. While the pre-recorded greeting may be a default greeting provided by the network, most often the wireless communication device user has pre-recorded a personalized greeting. Although pre-recording a personalized greeting is not difficult, it may be a time-consuming process. Even if a user has time to change their greeting to reflect their current or future circumstances, many users do not bother or forget to change the greeting. As such, the pre-recorded greeting may provide little information to the caller with respect to the user's circumstances and when the caller's call might be returned. As will be described in more detail below, this disclosure describes wireless communication devices and methods that may be able to provide a caller with a context-based message. The context may be determined as a function of an operational status, environmental status, usage status, location status, or other status of WCD 20. Also, in some cases, the message may be selected at least in part based on an identity of the caller. As one example, a message that is selected based on context may provide a specific reason why the user was not able to answer the phone by leveraging information relating to context. Described in more detail below, the context may relate to an operational status of WCD 20 or a component of WCD 20, a usage status of WCD 20 by the user, a location status of WCD 20 or the user, and/or an environmental status of WCD 20 or the user. In some cases, the information may be obtained through a variety of inputs associated with WCD 20, such as sensor inputs, system utilities, software applications running on WCD 20, or the like. In some cases, using input information, MSC 12, BSC 14, and/or WCD 20 may provide a caller with an estimate of when the call will be returned by the user.

Figure 2:
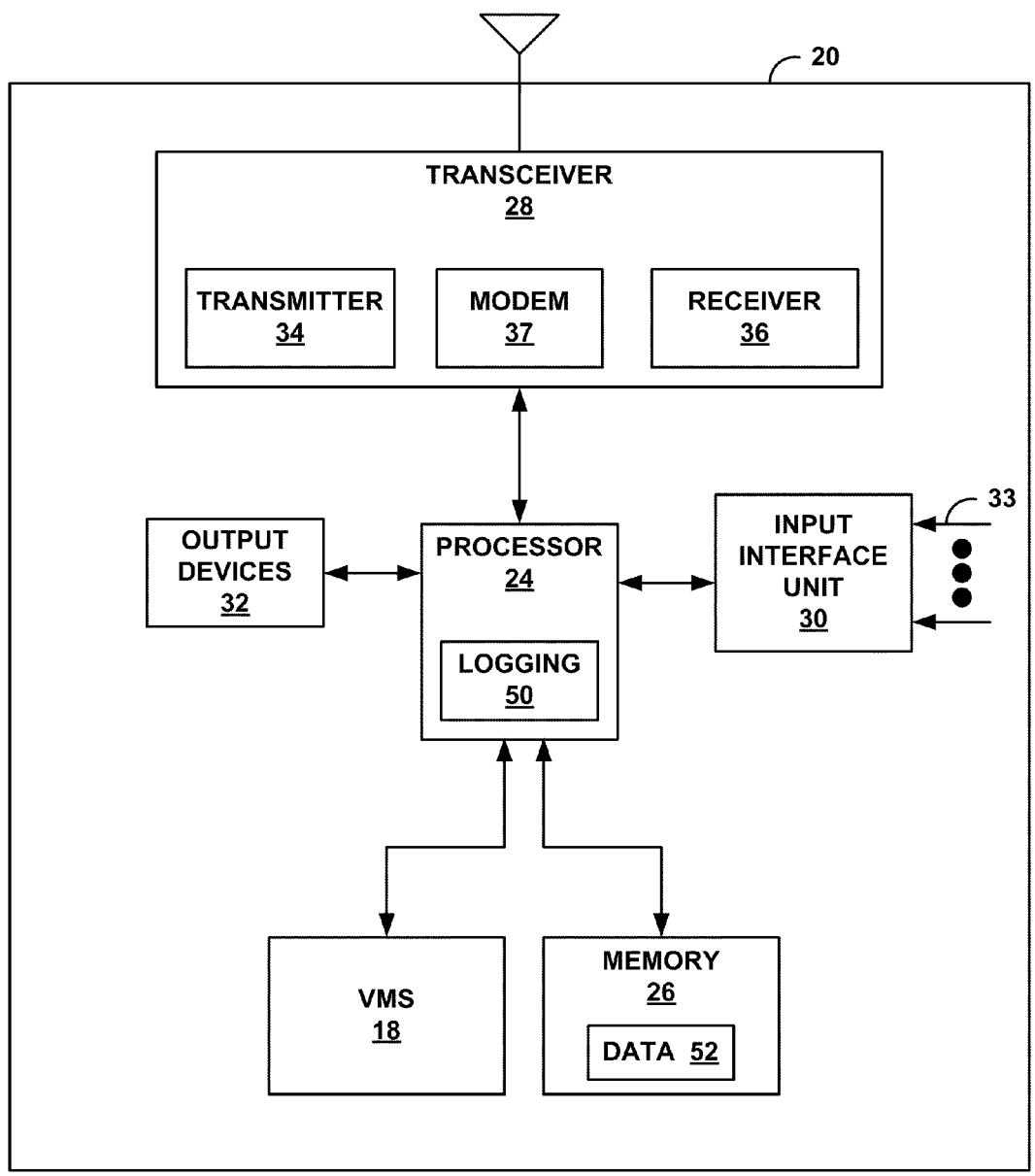
FIG. 2 is a block diagram illustrating an exemplary wireless communication device in accordance with this disclosure.

FIG. 2 is a block diagram illustrating an example of WCD 20 that performs techniques of this disclosure to select a voicemail greeting based on the status of one or more inputs of WCD 20. All of the elements described with respect to FIG. 2 may be implemented in hardware at some level, and may additionally have aspects implemented in software and/or firmware. As shown in FIG. 2, WCD 20 includes processor 24 in communication with memory 26, transceiver 28, input interface unit 30, and output devices 32.

Processor 24 may include one or more microprocessors, digital signal processors (DSPs), application specific integrated circuits (ASICs), field programmable gate arrays (FPGAs), discrete logic, or other processor arrangements suitable for processing computer code to facilitate the execution of the functions described in this disclosure. The computer code may comprise computer-readable instructions encoded in a computer-readable medium such as random access memory (RAM), synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

Processor 24 is constructed and arranged to receive a status from one or more inputs 33 of WCD 20 via input interface unit 30 and facilitate, either alone or in combination with other devices, selecting and transmitting a voicemail greeting, a text message, a graphic message, an email message, and/or any other message associated with the received status from one or more inputs 33 of WCD 20 to the caller via a device used by the caller. Processor 24 may include other circuitry such as analog to digital (A/D) converters and audio/video processors and codecs in some circumstances.

Memory device 26 may be a memory module, integrated circuit (IC), or other device suitable for storing digital data and instructions for execution by processor 24. In some examples, the memory may be non-volatile random access memory (NVRAM), electrically erasable programmable read-only memory (EEPROM), FLASH memory, or the like.

Transceiver 28 includes transmitter 34 and receiver 36 for exchanging wireless signals with BSC 14 to exchange information including voice, data, video, graphics, and audio. Transceiver 28 further includes a modulator/demodulator (modem) 37. The signals may be modulated by modem 37 according to a communication standard, e.g., such as code division multiple access (CDMA) or another communication standard or technique, and transmitted to via transmitter 24.

Messages and other communications recorded on a voicemail messaging system by a caller for a wireless communication device user may be presented to the user through output devices 32, such as an audio speaker or a display. The message data transmitted to the caller may be voicemail message data presented in conjunction with voicemail message recording services, or messages sent separately to a caller outside of the context of voicemail message recording. Such messages sent to a caller may generally be referred to in this disclosure as voicemail message data, but are generally distinguishable from messages recorded by a caller for a user that does not answer a call. Message data sent to the caller may also include voice, video, text, pictorial and/or graphic content.

In some examples, WCD 20 may include VMS 18, as shown in FIG. 2. That is, VMS 18 may reside within WCD 20 such that when a caller calls WCD 20, WCD 20 performs all voice messaging tasks including encoding, decoding, and voice messaging data storage. In accordance with aspects of the disclosure, VMS 18 may also select a response to a caller based on the context of WCD 20 and/or the user, as will be described in more detail below. In other aspects, VMS 18 may reside within MSC 12, BSC 14, or another device in the network.

Figure 3:
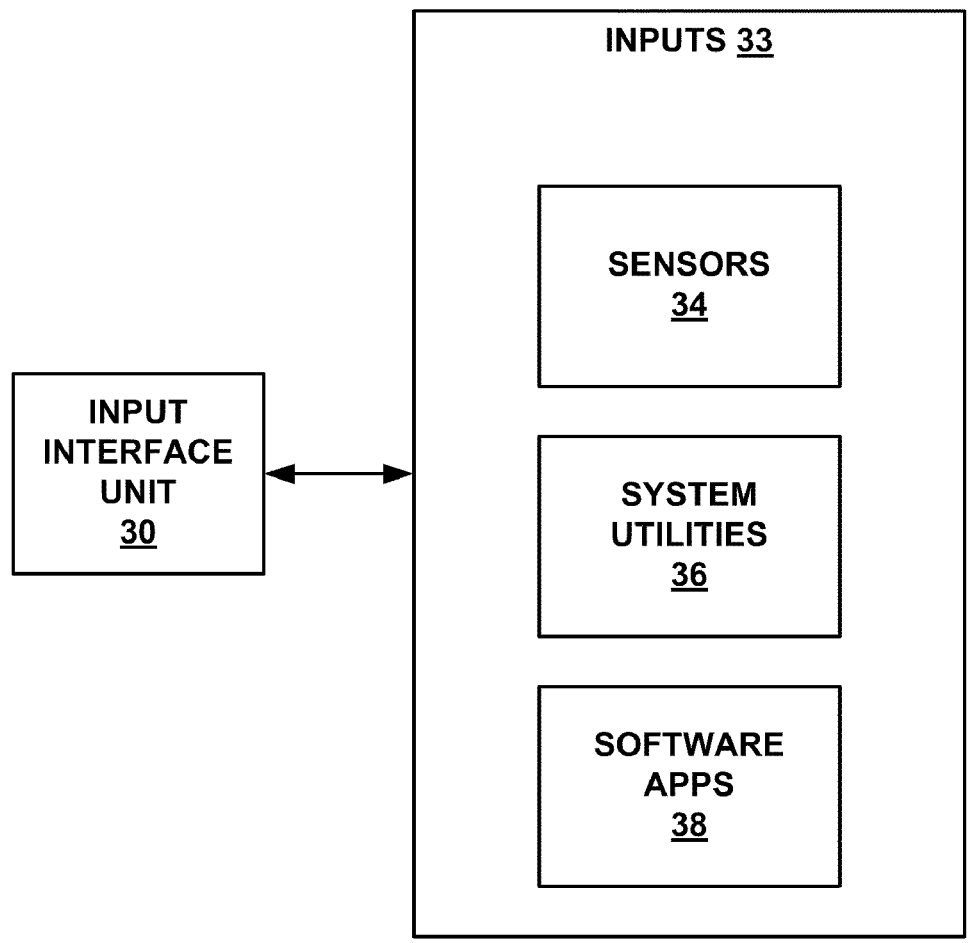
FIG. 3 is a block diagram illustrating an input interface unit receiving inputs of a wireless communication device in accordance with this disclosure.

FIG. 2 also depicts WCD 20 including an input interface unit 30 interfacing with one or more inputs 33. Input interface 30 may be a hardware device and/or implemented in software. Input interface 30 may operate on a processor or in conjunction with the processor. Input interface 30 may generate input information indicating a context of the wireless communication device. Inputs 33 may be associated with one or more sensors 34, system utilities 36, software applications 38, or the like to receive input information, such signals or data, as seen in FIG. 3. As shown in detail in FIG. 4, sensors 34 may include microphone 34A, accelerometer 34B, thermometer 34C, ambient light detector 34D, GPS data from a GPS receiver 34E, camera 34F, compass 34G, barometric pressure sensor 34H, proximity sensor 34I, pressure sensitive display 34J (e.g., LCD), and pressure sensitive skin 34K. System utilities 36 may include utilities that indicate whether a vibration setting 36A is on, outgoing call list 36B of WCD 20, remaining minutes 36C on the user's calling plan, control channel data 36D such as the SID, communication error rate 36E, battery charge level 36F, whether the headphone 36G is connected, status of the short range wireless interface 36H (e.g., Bluetooth) of WCD 20, network signal strength 36I, and clock data 36J. Software applications 38 may include applications or information related to whether the user is running a game 38A, running a video application 38B, or other software applications on WCD 20, and possibly the status or state of the application, e.g., elapsed video time, game checkpoint, or the like. Of course, in addition to those inputs listed above, there may be a number of other inputs that may be used as inputs 33, all of which are considered to be within the scope of this disclosure.

Figure 4:
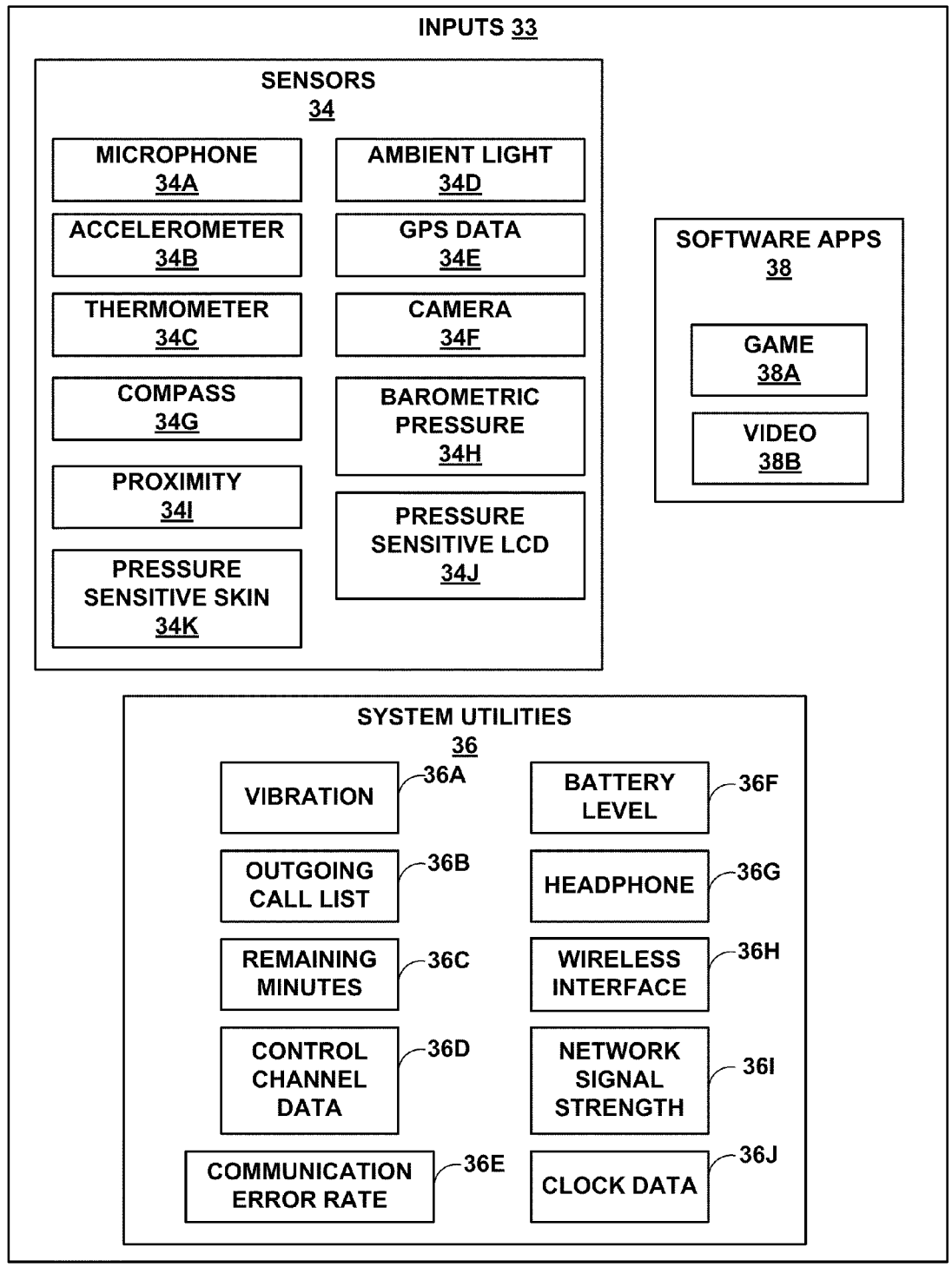
FIG. 4 is a block diagram illustrating the inputs of FIG. 3 in greater detail in accordance with this disclosure.

The sensors 34, system utilities 36, and software applications 38 shown in FIG. 4 may be grouped in terms of environmental status, usage status, operational status, and/or location status of WCD 20, the user, or both. Environmental status may include light levels received from ambient light detector 34D and/or camera 34F, sound levels received from microphone 34A, motion levels received from accelerometer 34B, and temperature levels received from thermometer 34C, directional information received from compass 34G, atmospheric information received from barometric pressure sensor 34H, proximity information received by proximity sensor 34I, as well as pressure information received from pressure sensitive display 34J and/or pressure sensitive skin 34K. Usage status may include whether headphone 36G is connected to WCD 20, whether the vibration setting 36A of the phone is on, the last call made from outgoing call list 36B, the remaining minutes 36C on a user's calling plan, the status of short range wireless interface 36H (e.g., Bluetooth), and the status of any software applications 38 (e.g., games, video, RSS feed, or the like) running on WCD 20. Operational usage may include the battery charge level 36F, clock data 36J, network signal strength 36I, and communication error rate 36I. Location status may include GPS data 34E as well as control channel data 36D such as SID information that may indicate whether WCD 20 is roaming.

Figure 5:
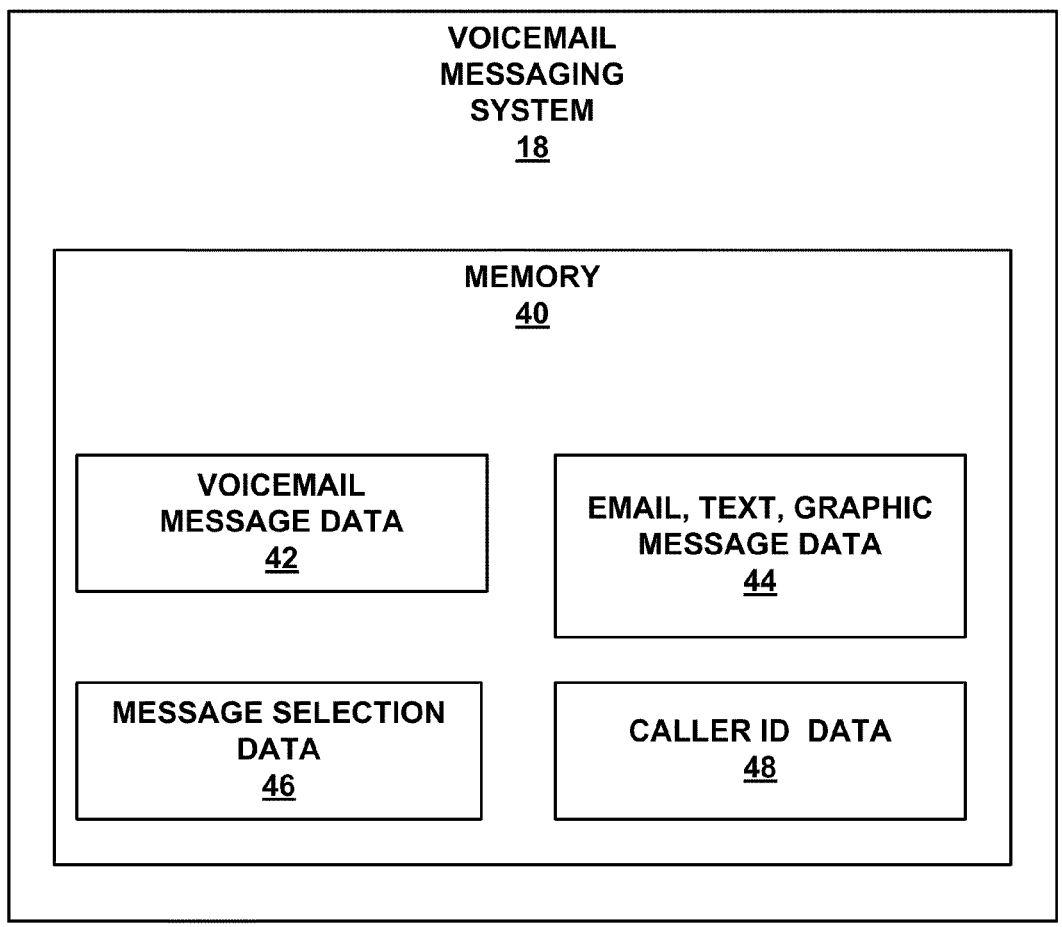
FIG. 5 is a block diagram illustrating a voicemail messaging system in accordance with this disclosure.

FIG. 5 depicts one example of VMS 18 in accordance with this disclosure. As previously mentioned, VMS 18 may reside within WCD 20, MSC 12, or BSC 14. Or VMS 18 may be directly coupled to either or both MSC 12 and BSC 14. VMS 18 includes memory device 40, which may store voicemail message data 42, email, text, graphic message data 44, message selection data 46, and caller identity (ID) data 48. Although not shown in FIG. 5, VMS 18 may include or be in communication with an encoder/decoder hardware unit, a program storage unit, and a processor that executes programs stored in the program storage unit that perform voice messaging functions such as encoding, decoding, and storage of voice messaging data.

In accordance with the disclosure, one or more inputs 33 may be used to provide a caller with a context-based message. The disclosure includes several example configurations that may be used to provide a caller with a context-based message. In one example, all analysis of inputs 33 and all selection of message data are performed by WCD 20 via VMS 18 residing within WCD 20. For instance, when a caller makes a call to the user of WCD 20, system 10 forwards the call to the user. WCD 20 receives the call and if the user does not answer, processor 24 analyzes the input information received from inputs 33 via input interface unit 30 to determine a context of WCD 20, e.g., an operational, environmental, usage, or location status of the device. The context may relate to an operational status of WCD 20 or a component of WCD 20, a usage status of WCD 20 by the user, a location status of WCD 20 or the user, and/or an environmental status of WCD 20 or the user. Input information may include signals or data obtained from outside WCD 20, within WCD 20, or both. In each case, the input information may refer generally to any information indicating a context. By analyzing input information available to it through input interface unit 30, processor 24 of WCD 20 may determine or identify one or more contexts of WCD 20.

If one or more contexts are identified, processor 24 of WCD 20 may access selection data 46 of VMS 18 in order to select message data based on the context(s). Processor 24 may then access voicemail message data 42 and/or email, text, and graphic message data 44 of VMS 18 and retrieve the voicemail, email, text, and/or graphic message data associated with the message selection data previously selected. In such a manner, a reply message to the caller is generated. The reply message may then be transmitted by a transmitter as a reply message to the caller. If voicemail message data 42 is retrieved, VMS 18 may decode the data and WCD 20 may transmit the reply message to the caller via transceiver 28 if the caller is calling from a landline, for example. Or, the voicemail message data may be directly transmitted via transceiver 28 to the caller in an encoded form and then decoded by the caller's device. If text message data 44 is selected, WCD 20 may transmit via transceiver 28 a text message to the caller. If email message data 44 is selected, WCD 20 may transmit via transceiver 28 an email message to the caller. If graphic message data 44 is selected, WCD 20 may transmit via transceiver 28 a graphic message to the caller. Once the reply message is transmitted to the caller, VMS 18 may record a message from the caller to the user.

It should be noted that the voicemail message data may include the encoded voice of the user. Or, the voicemail message data may include a computer-generated voice that is different from the user. Or, the voicemail message data may be a hybrid of the two such that a portion of data includes the user's encoded voice and a portion includes a computer generated voice. Also, the voicemail message data may be pre-recorded, either by the user or during manufacture of the wireless communication device. Or, the voicemail message data may be generated in real time. Or, a portion of the voicemail message data may be pre-recorded and a portion of the voicemail message data may be generated in real time. Similarly, the email, text, and graphic (including pictorial as well as video images) message data may be pre-recorded or pre-generated either by the user or during manufacture of the wireless communication device. Or, the email, text, and graphic message data may be generated in real time. Or, a portion of the email, text, and graphic message data may be pre-recorded or pre-generated and a portion of the email, text, and graphic message data may be generated in real time.

In another example in which all analysis of inputs 33 and selection of greeting messages is performed by WCD 20, WCD 20 receives the call and if the user does not answer, processor 24 automatically retrieves non-context based voicemail message data (an auto message) from voicemail message data 42. The non-context based voicemail message data is then immediately transmitted to the caller. The caller may or may not record a message for the user, and then terminate the call. Then, as in the example above, processor 24 of WCD 20 may identify one or more contexts of WCD 20 by analyzing input information available to it through input interface unit 30. If one or more contexts are identified, processor 24 of WCD 20 may access message selection data 46 of VMS 18 in order to select a message based on the context. Processor 24 may then access voicemail message data 42 and/or email, text, and graphic message data 44 of VMS 18 and retrieve the voicemail, email, text, and/or graphic message data associated with the message selection data previously selected. The generated reply message may then be transmitted to the caller, as described above. In such a manner, rather than transmitting the reply message immediately to the caller, the reply message is transmitted to the caller after an auto message has been transmitted to the caller.

In another example that may be used to provide a caller with a context-based message, rather than WCD 20 performing all analysis of inputs 33 and selection of greeting messages, BSC 14 may analyze inputs 33 and VMS 18 residing in or directly coupled to BSC 14 may select a context-based message in response to the caller. For instance, when a caller makes a call to the user of WCD 20, system 10 forwards the call to the user. WCD 20 receives the call and if the user does not answer, WCD 20 transmits via transceiver 28 the input information received by input interface unit 30 to BSC 14. Then, in a manner similar to that described above, a processor in communication with BSC 14 may analyze the input information and identify one or more contexts of WCD 20. If one or more contexts are identified, the processor in communication with BSC 14 may access message selection data 46 of VMS 18 in order to select a message based on the context(s). The processor may then access voicemail message data 42 and/or email, text, and graphic message data 44 of VMS 18 and retrieve the voicemail, email, text, and/or graphic message data associated with the message selection data previously selected. BSC 14 may then transmit the message data retrieved to the caller. Once the message data is transmitted to the caller, the caller may record a voicemail reply message to the user using VMS 18. Although the example describes using BSC 14 to analyze inputs 33 and select greeting messages, the disclosure also includes using MSC 12 to perform these functions if VMS 18 resides within or is directly coupled to MSC 12.

In an additional example that may be used to provide a caller with a context-based message, WCD 20 analyzes inputs 33 but VMS 18 residing in or directly coupled to BSC 14 may select a context-based message in response to the caller. For instance, when a caller makes a call to the user of WCD 20, system 10 forwards the call to the user. WCD 20 receives the call and if the user does not answer, processor 24 of WCD 20 analyzes the input information received from inputs 33 via input interface unit 30 to determine a context of WCD 20. WCD 20 then transmits the data representing the determined context to BSC 14. A processor in communication with BSC 14 may access message selection data 46 of VMS 18 residing in or coupled to BSC 14 in order to select a message based on the context(s). The processor may then access voicemail message data 42 and/or email, text, and graphic message data 44 of VMS 18 and retrieve the voicemail, email, text, and/or graphic message data associated with the message selection data previously selected. BSC 14 may then transmit the message data retrieved to the caller. Once the message data is transmitted to the caller, VMS 18 records a message from caller to the user. Although the example describes using BSC 14 to access message selection data in order to select a message based on the context(s) data transmitted by WCD 20, the disclosure also includes using MSC 12 to perform these functions if VMS 18 resides within or is directly coupled to MSC 12.

In another example that may be used to provide a caller with a context-based message, WCD 20 analyzes inputs 33 and determines a context of WCD 20 based on the analysis of inputs 33. VMS 18 residing within WCD 20 then selects a greeting message based on the context, and WCD 20 then transmits the message selection data to BSC 14. Then, VMS 18 residing in or directly coupled to BSC 14 retrieves the voicemail, email, text, and/or graphic message data associated with the message selection data previously selected by WCD 20. For instance, when a caller makes a call to the user of WCD 20, system 10 forwards the call to the user. WCD 20 receives the call and if the user does not answer, processor 24 of WCD 20 analyzes the input information received from inputs 33 via input interface unit 30 to determine a context of WCD 20. By analyzing input information available to it through input interface unit 30, processor 24 of WCD 20 may identify one or more contexts of WCD 20. If one or more contexts are identified, processor 24 of WCD 20 may access message selection data 46 of VMS 18 residing within WCD 20 in order to select a message based on the context(s). WCD 20 then transmits via transceiver 28 the selected message data to BSC 14. Then a processor in communication with BSC 14 may access voicemail message data 42 and/or email, text, and graphic message data 44 of VMS 18 residing within or coupled to BSC 14 and retrieve the voicemail, email, text, and/or graphic message data associated with the message selection data previously selected by WCD 20. BSC 14 may then transmit the message data retrieved to the caller. Once the message data is transmitted to the caller, the caller may record a message to the user using VMS 18. Although the example describes using BSC 14 to access message data based on the selected message data transmitted by WCD 20, the disclosure also includes using MSC 12 to perform these functions if VMS 18 resides within or is directly coupled to MSC 12.

Using the configurations described above, WCD 20, MSC 12, and/or BSC 14 may provide a caller with a specific reason why the user was not able to answer the phone. Or, WCD 20, MSC 12, and/or BSC 14 may provide a caller with an indication of when the call might be returned. Or, WCD 20, MSC 12, and/or BSC 14 may provide a caller with a specific reason why the user was not able to answer the phone and provide a caller with an indication of when the call might be returned.

As mentioned above, the message data may be selected at least in part based on an identity of the caller. For instance, the wireless communication device user may predetermine and store as caller ID data 48 in memory 40 of VMS 18 one or more telephone numbers, email addresses, or other identifying characteristics of one or more trusted callers to whom specific message data may be played. In such a manner, only if the caller is part of a predetermined caller group will they receive specific message data. So, a reply message to the caller is generated based at least in part on the identified caller group. For example, the user may determine that the user's caller group includes the user's spouse, children, immediate supervisor, and a small number of co-workers. The user then programs, stores, or otherwise captures the contact information data of those people into WCD 20. Processor 24 of WCD 20 then prepares the contact information data into a format that may then be stored as caller ID data 48 in memory 40. In some cases, there may be multiple predetermined caller groups. For instance, a user may have a first caller group for family members, a second caller group for co-workers, and a third caller group for friends, or for friends and family, etc. Each caller group may have different settings. So, if the user has a first caller group for family members only and a second caller group for co-workers only, the user may define the message selection data such that co-workers in the second caller group, as defined in caller ID data 48, may not receive the same message that may be sent to family members, as defined in caller ID 48. It should be noted that a caller group may comprise a single caller. Also, it should be noted that the term "caller ID data" as used in the disclosure is not to be confused with the caller ID function that is common in conventional communication devices. Rather, the term "caller ID data" is a broad term that, although it may include data that may be similar to that used in the caller ID function, it may include additional data and information not used in the caller ID function, such as email addresses.

By way of example, if a caller makes a call to the user, the network forwards the call to the user's wireless communication device. In one example, processor 24 of WCD 20 analyzes the incoming call and accesses caller ID data 48 of VMS 18 to determine whether the caller is part of a predetermined caller group as defined in caller ID data 48. If not, then processor 24 may select a non-context based greeting message to be transmitted from WCD 20 to the caller. Or, WCD 20 may transmit information to MSC 12 or BSC 14 indicating that the caller is not part of a predetermined caller group and either MSC 12 or BSC 14 may access VMS 18 residing within or coupled to MSC 12 or BSC 14, and select a non-context based greeting message to be transmitted to the caller. Or, WCD 20 may transmit the selected non-context based greeting message to either MSC 12 or BSC 14, which in turn would retrieve the message data associated with the selected non-context based greeting message and transmit the greeting message to the caller.

In one example, in order to generate a context-based reply message for a caller in the predetermined caller group, the reply message may be generated and transmitted by WCD 20, rather than being stored on or generated by a wireless network provider's equipment. As such, if the user does not answer his or her phone, WCD 20 generates the proper message, answers the call, plays the message (with the microphone muted) and then forwards the caller to voicemail. In this fashion, the wireless network provider's equipment does not need to be aware of the changing reply message.

Numerous inputs may be used in order to select a context based greeting message to be played to a caller, a few of which are depicted in FIG. 3. Microphone 34A may be used to select a message. WCD 20 may determine from its microphone input that, because the ambient noise is above a threshold noise level, the user is in a noisy environment (e.g., a concert). Because the environment is so noisy, it is unlikely that the user will be able to hear the caller if the user answers the call. Using one of the configurations described above, processor 24 of WCD 20 may access message selection data 46 to select a message, access voicemail message data 42 or email, text, and graphic message data 44 to retrieve the selected message, and then transmit the message data to the caller.

Or, using another configuration described above, WCD 20 may transmit the input information to BSC 14 (or MSC 12). A processor in communication BSC 14 may analyze the input information and determine that the microphone noise level is above a threshold level and thus WCD 20 is located in a noisy environment. The processor may then access VMS 18 residing within or coupled to BSC 14 and select a message from message selection data 46 based on context of a noisy environment. Then, the processor accesses voicemail message data 42 or email, text, and graphic message data 44 to retrieve the selected message data, and BSC 14 transmits the greeting message to the caller.

Or, using another configuration described above, processor 24 of WCD 20 may analyze the input information and determine that the microphone noise level is above a threshold level and thus WCD 20 is located in a noisy environment. WCD 20 may then transmit to BSC 14 (or MSC 12) the determined context, i.e., a noisy environment. A processor in communication with BSC 14 may access VMS 18 residing within or coupled to BSC 14 and select a message from message selection data 46. Then, the processor in communication with BSC 14 accesses voicemail message data 42 or email, text, and graphic message data 44 to retrieve the selected message data, and BSC 14 transmits the greeting message to the caller.

Or, using another configuration described above, processor 24 of WCD 20 may analyze the input information and determine that the microphone noise level is above a threshold level and thus WCD 20 is located in a noisy environment. Processor 24 of WCD 20 may then access message selection data 46 of VMS 18 residing within WCD 20 to select a message, access voicemail message data 42 or email, text, and graphic message data 44. WCD 20 may then transmit to BSC 14 (or MSC 12) the selected greeting. A processor in communication with BSC 14 may access VMS 18 residing within or coupled to BSC 14 and retrieve from voicemail message data 42 or email, text, and graphic message data 44 the selected message. Then, BSC 14 may transmit the greeting message to the caller.

By way of example, the voicemail greeting message associated with the microphone input and played for the caller may say something like, "The microphone was turned on, but the environment was very noisy. The user either did not hear the phone ring or would not have been able to hear to talk. Please leave a message." In one example, microphone 34A signals may be compared against the current vibration setting 36A of the phone. If vibration setting 36A is on, generally the ringer will be off. So, in the example above, if vibration setting 36A of the phone is on, the message described above may simply indicate that the user may be unable to talk, rather than indicating that the user did not hear the phone ring.

The threshold levels mentioned in the disclosure may be user defined, pre-defined during manufacture of the wireless communication device, or pre-defined during manufacture, but modifiable by the user.

WCD 20, BSC 14, or MSC 12 may use accelerometer 34B to select message data. A processor may analyze signals from accelerometer 34B in order to determine when WCD 20 was last moved. Using that information, WCD 20, BSC 14, or MSC 12 may generate a reply message that states, for example, "The wireless communication device has not moved in more than 2 hours. The user is likely away from the device. The user will call you back."

Or, WCD 20, BSC 14, or MSC 12 may use thermometer 34C to select message data. A processor may analyze the temperature detected by thermometer 34C, compare it to a threshold level, and select a message based on that comparison.

Or, WCD 20, BSC 14, or MSC 12 may use ambient light detector 34D to select message data. A processor may analyze the light level detected by ambient light detector 34D, compare it to a threshold, and in some examples, determine from clock data how long the wireless communication device has been at that light level. Using that information, WCD 20, BSC 14, or MSC 12 may generate a reply message that states, for example, "It appears that this device has been in a darkened area for 1 week. The user may have lost this device. We suggest that you try the user at phone number (612) 555-1212."

Similar to ambient light detector 34D, WCD 20, BSC 14, or MSC 12 may use camera 34F to select message data. A processor may analyze the light level detected by camera 34F, compare it to a threshold level, and select a greeting based on that comparison.

Or, WCD 20, BSC 14, or MSC 12 may use GPS data 34E to select message data. Processor 24 may execute logging instructions 50 that cause data 52 relating to input information generated by input interface 30 to be stored in memory 26. By using statistical modeling techniques, machine learning techniques, data mining techniques, user-habit tracking techniques, and/or any other technique that may recognize patterns, processor 24, or a processor in communication with BSC 14, or MSC 12, may analyze the data stored in memory 26 in order to determine one or more patterns. For example, processor 24 may execute instructions that cause data 52 relating to GPS information from a GPS receiver to be stored in memory 26. Data 52 that may be stored may include the day and time, an originating point of travel at a given time as indicated by GPS information, a destination point of travel at a given time as indicated by the GPS information, the frequency at which a user visits a particular destination when leaving from a particular starting point (e.g., frequency of home to office), and the likelihood that the user will arrive at a destination given the user's proximity to that destination, for example. Data 52 relating to input information generated by input interface 30 may be stored in memory 26 in lookup tables, linked lists, hash tables, trees, binary trees, or any other type of data structure.

In some examples, the user may manipulate the stored data in order to improve the pattern recognition. The user may, for example, attach metadata. For instance, if a user drives from home to work, the user may assign metadata to the data representing GPS information indicating that the start point was "home" and that the end point was "work." Or, if a user drives from work to his or her parents' home, the user may assign metadata to the data representing GPS information indicating that the end point was "Dad's house." Then, after the user has been driving with WCD 20 on several occasions, for example, a processor in communication with WCD 20, BSC 14, or MSC 12 may execute instructions that define the statistical modeling techniques, machine learning techniques, data mining techniques, user-habit tracking techniques, and/or any other technique that may recognize patterns and/or trends.

By way of example, after executing the instructions defining the techniques and analyzing the results, the processor in communication with WCD 20, BSC 14, or MSC 12 may recognize that the user only drives from work to home between 5 pm and 5:30 pm on Monday through Thursday, but on Friday the user always drives to "Dad's house," a longer drive, between 5 pm and 8 pm. When a caller calls the user, processor 24 may analyze the information from a GPS receiver and determine that WCD 20 is moving rapidly, thereby indicating that the user is most likely driving a car. The processor may further determine that it is 7 pm on Friday. The processor may also analyze information such as the GPS information currently or contemporaneously being received as well as the previously stored GPS data 34E, the frequency at which the user visits "Dad's house" when starting from "work," and that the user always arrives at "Dad's house" when the user is within 40 miles from "Dad's house." Using that information, WCD 20, BSC 14, or MSC 12 may generate a reply message that states, for example, "It appears that the user is driving and may not be able to answer the phone. However, it appears that the user is on the way to dad's house and will be there in about an hour. The user will call you back when finished driving."

Or, in another example, when a caller calls the user, processor 24 may analyze the information from a GPS receiver and determine that WCD 20 is moving rapidly, thereby indicating that the user is most likely driving a car. The processor may further determine that the user has just left "work" and is driving towards "home" at 60 miles/hour and is currently 10 miles from "home." Using that information, WCD 20, BSC 14, or MSC 12 may generate a reply message that states, for example, "It appears that the user is driving and may not be able to answer the phone. However, it appears that the user is on his way home, and is 10 miles from that destination. Based on the current speed, the user should be home in about 10 minutes. The user will call you back when finished driving."

Or, in another example, when a caller calls the user, processor 24 may analyze the information from a GPS receiver and determine that WCD 20 is moving greater than 20 miles/hour and less than 90 miles/hour, for example, thereby indicating that the user is most likely driving a car, and not walking or in a train. A processor may analyze the short range wireless interface input information from wireless interface 36H and determine that there is no short range wireless connection to WCD 20. As such, the user's short range wireless headset is not enabled. Usage of WCD 20 without a headset or other "hands free" device while the user is driving may be prohibited in some states. In response, a processor in communication with WCD 20, BSC 14, or MSC 12 may generate a message that states, for example, "It appears that a Bluetooth-enabled headset is not active and that the user is driving. It may be dangerous or illegal for the user to talk now without a headset. The user will call you back later." Thus, GPS data 34E may be used as an indication of driving (based on a speed in miles per hour).

Or, in another example, when a caller calls the user, processor 24 may analyze the information from a GPS receiver and determine that WCD 20 is more than 4000 miles from "home." Based on this distance, the processor determines that heavy roaming charges likely apply. In response, a processor in communication with WCD 20, BSC 14, or MSC 12 may generate a message that states, for example, "The user is more than 4000 miles from home. In order for him to call you, he would have to pay heavy roaming charges because he is likely out of his network. He will likely call you back when he is in service. You may want to try contacting him via email or by using a voice-over-IP service such as Skype. Please leave your message after the beep."

Or, WCD 20, BSC 14, or MSC 12 may use compass 34G to select message data. A processor may analyze the direction detected by compass 34G and select a message based on that direction.

Or, WCD 20, BSC 14, or MSC 12 may use proximity sensor 34I to select message data. A processor may analyze the proximity information detected by proximity sensor 34I and select a message based on the proximity information.

Or, WCD 20, BSC 14, or MSC 12 may use pressure sensitive display 34J to select message data. A processor may analyze the pressure information detected by pressure sensitive display 34J and select a message based on the pressure information.

Or, WCD 20, BSC 14, or MSC 12 may use pressure sensitive skin 34I to select message data. A processor may analyze the pressure information detected by pressure sensitive skin 34I and select a message based on the pressure information.

Or, WCD 20, BSC 14, or MSC 12 may use outgoing call list 36B to select message data. A processor may analyze the date and time that the last call was transmitted from WCD 20. Using that information, WCD 20, BSC 14, or MSC 12 may generate a reply message that states, for example, "No outgoing calls have been made with this device in 3 weeks. The user may have lost this device. We suggest that you try the user at phone number (612) 555-1212 or send him an email."

Or, WCD 20, BSC 14, or MSC 12 may use the remaining minutes 36C on the user's calling plan to select message data. A processor reside within or in communication with WCD 20, BSC 14, or MSC 12 may analyze the user's remaining minutes 36C, compare the remaining minutes to a threshold level, and select a greeting based on the comparison. Using that information, WCD 20, BSC 14, or MSC 12 may generate a reply message that states, for example, "The user has 15 minutes left on his calling plan for the month and wants to save these for an emergency. If you would like to leave a message, please wait for the tone."

Or, WCD 20, BSC 14, or MSC 12 may use control channel data 36D to select message data. A processor may analyze the control channel data 36D and determine from the SID received on its control channel that the device is roaming. Using that information, WCD 20, BSC 14, or MSC 12 may generate a reply message that states, for example, "The wireless communication device is currently roaming and if the user answers, significant charges may be incurred. It may be better to email the user. If you would like to leave a message, please wait for the tone."

Or, WCD 20, BSC 14, or MSC 12 may use communication error rate 36E to select message data. A processor may analyze the communication error rate 36E and compare it to a threshold error rate. If communication error rate 36E exceeds the threshold, WCD 20, BSC 14, or MSC 12 may generate a reply message that states, for example, "The error rate is too high at the moment which may be the result of interference. A poor connection would result. If you would like to leave a message, please wait for the tone."

Or, WCD 20, BSC 14, or MSC 12 may use battery charge level 36F to select message data. A processor may analyze the battery charge level and compare it to battery charge level threshold in order to determine how much longer WCD 20 may be used before the battery is discharged. Using that information, WCD 20, BSC 14, or MSC 12 may generate a reply message that states, "It appears that there are only 10 minutes of talk time remaining. The user would like to save that time for emergency use, if necessary. The user will call you back shortly from a land line."

Or, WCD 20, BSC 14, or MSC 12 may use the headphone 36G connection to select message data. A processor may analyze the headphone jack input information and determine that headphone 36G is not connected. Using that information, WCD 20, BSC 14, or MSC 12 may generate a reply message that states, for example, "It appears that a headphone is not connected. It may be dangerous for the user to talk now without a headset. The user will call you back later."

Or, WCD 20, BSC 14, or MSC 12 may use short range wireless interface 36H (e.g., Bluetooth) to select message data. A processor may analyze the short range wireless interface input information and determine that there is no short range wireless connection to WCD 20. As such, the user's short range wireless headset is not enabled. In response, the wireless communication device may provide a greeting that states, for example, "It appears that a Bluetooth-enabled headset is not active. It may be dangerous for the user to talk now without a headset. The user will call you back later."

Or, WCD 20, BSC 14, or MSC 12 may use network signal strength 36I to select message data. A processor may analyze the network signal strength and compare it to a threshold level. Using that information, WCD 20, BSC 14, or MSC 12 may generate a reply message that states, for example, "The wireless communication device appears to be in a location with poor coverage. Even if you were connected the connection would be of poor quality, or may be dropped. The user will call you back when coverage is better."

Or, WCD 20, BSC 14, or MSC 12 may use clock data 36J of WCD 20 to select message data. A processor may analyze the time and, using that information, the greeting may state, for example, "The time is currently 3:30 am. The user is most likely asleep. The user will call you back."

Or, WCD 20, BSC 14, or MSC 12 may use one or more software applications running on the device to select message data. For example, the user may be playing game 38A, watching video 38B (e.g., a movie, television episode, or streaming a movie to TV via HDMI, etc.), or using some other application on the phone, and may wish to remain undisturbed during that time. In at least one example, the user may flag particular applications or other software, such as games 38A and video 38B, that the user would not like to be disturbed while using. Then, in response to a user running those flagged software applications, processor 24 executes logging instructions 50 that cause data 52 relating to input information generated by input interface 30 to be stored in memory 26. If game 38A was flagged, for example, data 52 that may be stored may include the day and time that the user began playing game 38A, the score achieved in the game, the length of time the game was played, the number of levels reached in the game, the number of "lives" in a game, or the like. By using statistical modeling techniques, machine learning techniques, data mining techniques, user-habit tracking techniques, and/or any other technique that may recognize patterns, processor 24, or a processor in communication with BSC 14, or MSC 12, may analyze data 52 stored in memory 26 in order to determine patterns. When a caller calls the user and the user is currently using a flagged application, processor 24 may first compare any applications running against a list of flagged applications that was previously stored in memory. Then, processor 24 executes instructions to determine the current status of the flagged application. After that, a processor in communication with WCD 20, BSC 14, or MSC 12 may use the analyzed data from previous games as well as the contemporaneous data generated by the current flagged application and generate a reply message to the caller.

By way of example, if game 38A was flagged, processor 24 executes logging instructions 50 that cause data 52 related to game 38A to be stored in memory 26 when game 38A is played. Then, after game 38A has been played on one or more occasions, a processor in communication with WCD 20, BSC 14, or MSC 12 may execute instructions that define the statistical modeling techniques, machine learning techniques, data mining techniques, user-habit tracking techniques, and/or any other technique that may recognize patterns and/or trends. After executing the instructions defining the techniques and analyzing the results, the processor in communication with WCD 20, BSC 14, or MSC 12 may recognize that the user plays game 38A on weekdays between 12:30 pm and 1:00 pm, the user plays on average for 10 minutes, but has played for as long as 30 minutes, and that the average score is 150,000 points, for example. Additionally, the user may play game 38 on weekdays after work and for a longer time, on average 20 minutes, for example. When a caller calls the user and the user is currently using a flagged application, processor 24 may first compare game 38A against a list of flagged applications that was previously stored in memory and determine that game 38A is a flagged application. Then, processor 24 executes instructions to determine the current status of the user's game. For instance, processor 24 may determine that the time elapsed in the current game is 3 minutes, the score is 50,000 points, and it may be Wednesday at 12:55 pm. In response, a processor in communication with WCD 20, BSC 14, or MSC 12 may use the analyzed data from previous games as well as the data from the current game and generate a reply message that states, for example, "The user is using an application where performance suffers from interruptions. While the user may be unavailable for another 27 minutes, the user will likely be finished in less than 7 minutes, and possibly 5 minutes." After analyzing the data from the previous games and the data from the current game, the processor determines that the user may play for as long 30 minutes (27 minutes longer than the elapsed 3 minutes), the user will likely be finished in under 7 minutes (based on the 10 minute average length of play during weekdays at the current), but possibly 5 minutes (based on the current day and time, and that the user has not played the game past 1 pm on weekdays).

By way of another example, if game 38A was flagged, a processor in communication with WCD 20, BSC 14, or MSC 12 may use the analyzed data from previous games as well as the data from the current game and determine that a user's score is so low, the user may be finished sooner than normal. Continuing the example above, when a caller calls the user and the user is currently using a flagged application, processor 24 may first compare game 38A against a list of flagged applications that was previously stored in memory and determine that game 38A is a flagged application. Then, processor 24 executes instructions to determine the current status of the user's game. For instance, processor 24 may determine that the time elapsed in the current game is 3 minutes, the score is 1,000 points, and it may be Wednesday at 12:55 pm. In response, a processor in communication with WCD 20, BSC 14, or MSC 12 may use the analyzed data from previous games as well as the data from the current game and generate a reply message that states, for example, "The user is using an application where performance suffers from interruptions. While the user may be unavailable for another 27 minutes, the user will likely be finished in less than 7 minutes, and possibly 2 minutes because the user's score is so low." After analyzing the data from the previous games and the data from the current game, the processor determines that the user may play for as long 30 minutes (27 minutes longer than the elapsed 3 minutes), the user will likely be finished in under 7 minutes (based on the 10 minute average length of play), but possibly 2 minutes (based on the user's current low score of 1,000 points, when the user typically averages 150,000 points in 10 minutes).

It should be noted that the order in which the pattern recognition and current flagged application status determination are performed may be different than that described above. In some examples, the pattern recognition may be performed after processor 24 determines the status of the current flagged application. The pattern recognition may be performed in real time, for instance.

Although only games 38A and GPS data 34E were described above with respect to data logging, statistical modeling, and pattern recognition, the disclosure is not intended to be limited to only those inputs. Rather, there are numerous inputs and combinations of inputs described above, as well as other inputs and combinations of inputs not described that are nevertheless considered to be part of the disclosure. For example, data related to outgoing calls from the outgoing call list 36B may be logged so that a processor in communication with WCD 20, BSC 14, or MSC 12 may recognize what days of the week and what times of the day a user makes calls. Or, data related to the battery charge level from battery charge level 36F may be logged to so that a processor in communication with WCD 20, BSC 14, or MSC 12 may recognize that a user does not make calls when the battery charge level is below a certain level.

Or, if the user has flagged software that plays video 38B the time remaining in the video being played or being streamed, for example, may be used to provide information to a caller. The processor may analyze the video and determine the time remaining. Using that information, WCD 20, BSC 14, or MSC 12 may generate a reply message that states, for example, "The user appears to be using an application on the device at the moment. The user will most likely be finished in 10 minutes. The user will call you back shortly."

Or, if the user has flagged a RSS feed application 38, such as a RSS news feed application, the processor may analyze stored data 52 related to previous executions of the RSS feed application, such as the duration of time that the user uses the RSS feed application. By way of example, the user may, on average, execute the RSS news feed for 12 minutes, and currently the RSS news feed has been running for 6 minutes. Using that information, WCD 20, BSC 14, or MSC 12 may generate a reply message that states, for example, "The user should be able to return your call in about 6 minutes. He is busy with an important task right now and apologizes for the inconvenience. Please leave your message after the beep."

In one example, each time the user attempts to run a flagged software application, processor 24 executes instructions that prompt the user to confirm that the user does not want to be disturbed while running the application. If the user answers yes, then the software is run and processor 24 prevents callers from being connected to the user. If the user answers no, then the software is run and processor 24 allows callers to reach the user while the user is running the flagged software application.

In some examples, processor 24 executes logging instructions 50 that cause data 52 related to any running software application 38 to be continuously stored to memory 26, regardless of whether software application 38 was flagged. In other words, a computer process is running in the background on WCD 20 monitoring all of the activity of the running applications. The computer process may log data related to how often the user uses an application for a given day, or time (e.g., morning, afternoon, night), and the frequency at which the user answers calls when an application is running. In such a manner, the background process is always running and monitoring the usage of all applications, whether or not the applications are flagged as "do not disturb" applications.

By way of example, when a caller calls the user and the user is using an unflagged application, processor 24 may access data 52 from memory 26 and execute instructions that define statistical modeling techniques, for example. If the user is playing an unflagged game 38A such as Tetris, for example, processor 24 may execute instructions that define statistical modeling techniques on data 52 related to Tetris. In such a manner, the statistical modeling techniques may identify from data 52 that 99% of the time the user does not answer a call when playing Tetris 99% of the time. Processor 24 may compare this percentage against a threshold value (e.g., 50%, 75%, etc.), and based on the comparison, WCD 20, BSC 14, or MSC 12 may generate a message that states, for example, "The user appears to be using an application on the device at the moment that suffers from interruptions. The user will call you back shortly when he is finished. Please leave a message after the beep." In this manner, even if a particular application is not flagged as "do not disturb," WCD 20 is able to determine from a statistical model developed based on the data that had been continuously logged previously that the user does not answer calls 99% of the time when that particular application is being used. As such, WCD 20, BSC 14, or MSC 12 should generate a message indicating that the user is busy and will return the caller's call shortly.

It should be noted that in some examples, the caller must belong to the user's trusted caller group in order for the message to be generated. In other examples, it is not necessary for the caller to belong to the user's trusted caller group in order for the message to be generated.

Inputs 33 may be used in combination to select message data. For example, accelerometer 34B and clock data 36J may be used together. A processor may analyze clock data to determine a time, as well as signals from accelerometer 34B in order to determine when WCD 20 was last moved. Using that information, the greeting may state, for example, "The wireless communication device has not moved in more than 2 hours and it is 3 am. The user is likely asleep. The user will call you back." Numerous combinations of inputs 33 are possible and, although not described further, are considered part of the disclosure.

Figure 6:
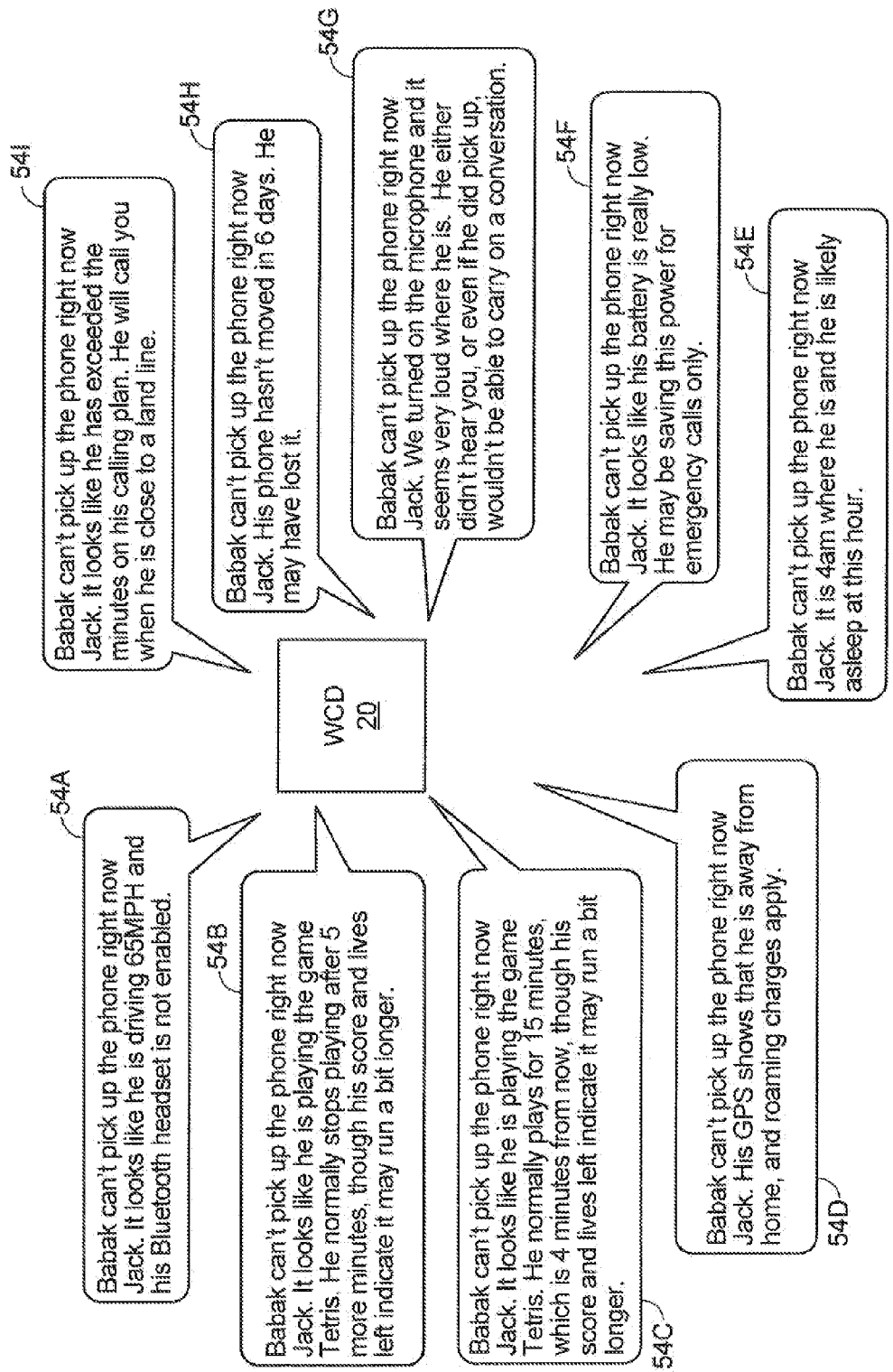
FIG. 6 is a conceptual diagram depicting a number of context-based messages that may be generated in response to a caller calling a wireless communication device.

FIG. 6 is a conceptual diagram of WCD 20, depicting a number of example, context-based messages 54A-I that may be generated by WCD 20, BSC 14, or MSC 12 in response to a caller calling WCD 20. Although the example WCD 20 depicted in FIG. 6 shows the context-based messages playing from WCD 20, in some examples, the context-based messages are transmitted only to the caller from WCD 20, BSC 14 or MSC 12, as described above, and not played from WCD 20.

Message 54A of FIG. 6 illustrates an example generated message stating, "Babak can't pick up the phone right now Jack. It looks like he is driving 65 miles/hour and his Bluetooth headset is not enabled." Such a message may be generated by WCD 20, BSC 14, or MSC 12 after a processor analyzed both the information from a GPS receiver and determined that WCD 20 is moving rapidly and is likely in a car, and the information from wireless interface 36H and determined that there was no short range wireless connection to WCD 20.

Message 54B of FIG. 6 illustrates another example generated message stating, "Babak can't pick up the phone right now Jack. It looks like he is playing the game Tetris. He normally stops playing after 5 more minutes, though his score and lives left indicate it may run a bit longer." Such a message may be generated by WCD 20, BSC 14, or MSC 12 after processor 24 compared the applications running (i.e., Tetris, game 38A) against a list of flagged applications that was previously stored in memory, executed instructions to determine the current status of the flagged Tetris game, and analyzed data from previous Tetris games as well as the contemporaneous data generated by the current Tetris game.

Message 54C of FIG. 6 illustrates another example generated message stating, "Babak can't pick up the phone right now Jack. It looks like he is playing the game Tetris. He normally plays for 15 minutes, which is 4 minutes from now, though his score and lives left indicate it may run a bit longer." Such a message may be generated by WCD 20, BSC 14, or MSC 12 after processor 24 compared the applications running (i.e., Tetris, game 38A) against a list of flagged applications that was previously stored in memory, executed instructions to determine the current status of the Tetris game, and analyzed data from previous games as well as the contemporaneous data generated by the current Tetris game.

Message 54D of FIG. 6 illustrates another example generated message stating, "Babak can't pick up the phone right now Jack. His GPS shows that he is away from home, and roaming charges apply." Such a message may be generated by WCD 20, BSC 14, or MSC 12 after a processor analyzed the information from a GPS receiver and determined that WCD 20 is out of the user's network, and as such, roaming charges may apply.

Message 54E of FIG. 6 illustrates another example generated message stating, "Babak can't pick up the phone right now Jack. It is 4 am where he is and he is likely asleep at this hour." Such a message may be generated by WCD 20, BSC 14, or MSC 12 after a processor analyzed the information from clock data 36J of WCD 20, determined that the current time is 4 am, and as such, the user is likely asleep.

Message 54F of FIG. 6 illustrates another example generated message stating, "Babak can't pick up the phone right now Jack. It looks like his battery is really low. He may be saving this power for emergency calls only." Such a message may be generated by WCD 20, BSC 14, or MSC 12 after a processor analyzed the information from battery charge level 36F of WCD 20, determined that the current battery charge level is below a threshold value, and as such, the user is likely saving the remaining battery life for emergency calls.

Message 54G of FIG. 6 illustrates another example generated message stating, "Babak can't pick up the phone right now Jack. We turned on the microphone and it seems very loud where he is. He either didn't hear you, or even if he did pick up, wouldn't be able to carry on a conversation." Such a message may be generated by WCD 20, BSC 14, or MSC 12 after a processor analyzed the information from microphone 34A. The processor may have determined that because the ambient noise is above a threshold noise level, the user is in a noisy environment, and, as such, the user either could not hear the phone ring, or would not be able to hear the caller even if the user did answer the phone.

Message 54H of FIG. 6 illustrates another example generated message stating, "Babak can't pick up the phone right now Jack. His phone hasn't moved in 6 days. He may have lost it." Such a message may be generated by WCD 20, BSC 14, or MSC 12 after a processor analyzed the information from accelerometer 34B in order to determine when WCD 20 was last moved. Based on the determination that the phone had not moved in 6 days, the processor generated a message indicating that the phone may have been lost.

Message 54I of FIG. 6 illustrates another example generated message stating, "Babak can't pick up the phone right now Jack. It looks like he has exceeded the minutes on his calling plan. He will call you when he is close to a land line." Such a message may be generated by WCD 20, BSC 14, or MSC 12 after a processor analyzed the user's remaining minutes 36C on his calling plan and determined that the user has exceeded the minutes on his calling plan. As such, the user most likely would prefer to talk to the caller from a land line phone.

Figure 7:
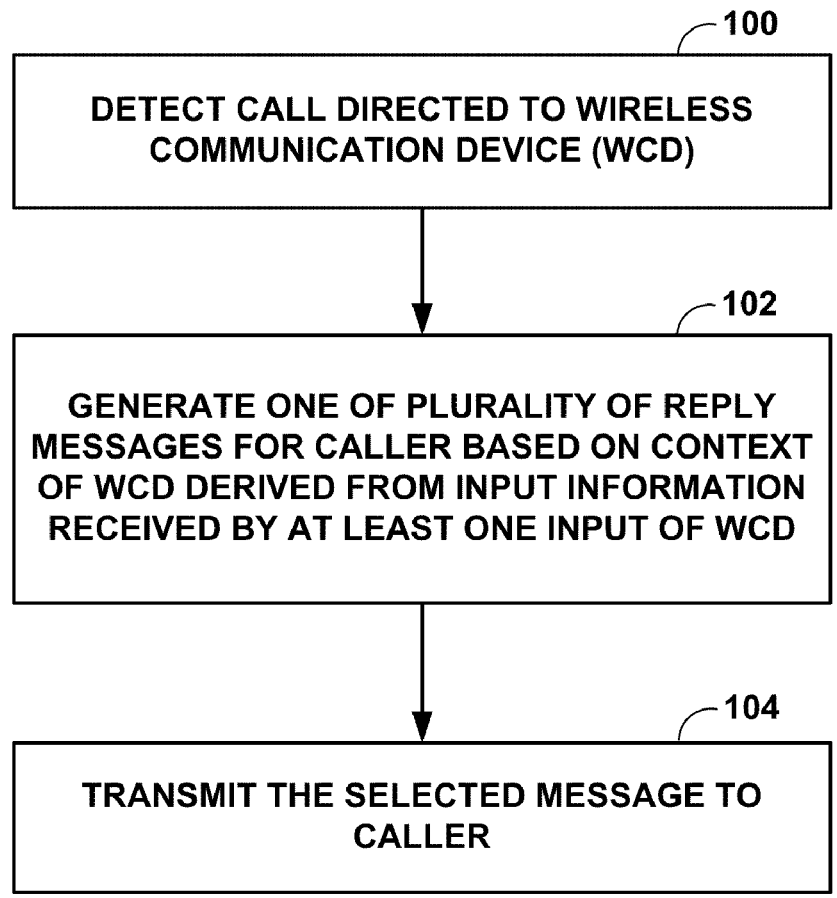
FIG. 7 is a flow diagram illustrating a reply message selection method in accordance with this disclosure.

FIG. 7 is a flow diagram illustrating a method for selecting a reply message when a wireless communication device user does not receive or answer the call, in accordance with this disclosure. As seen in FIG. 7, with reference to FIGS. 1-2, system 10 detects a call directed to WCD 20 (100). MSC 12, BSC 14, and/or WCD 20 of system 10 may detect the call directed to WCD 20. System 10, via VMS 18, selects one of a plurality of messages based on the context of WCD 20 derived from input information received by at least one input of the wireless communication device (102). As described in detail above, VMS 18 may reside within WCD 20, BSC 14, or MSC 12, or a combination thereof. System 10 then transmits the selected message to the caller (104). As described above, BSC 14 or WCD 20 may be used to transmit the selected message.

Figure 8:
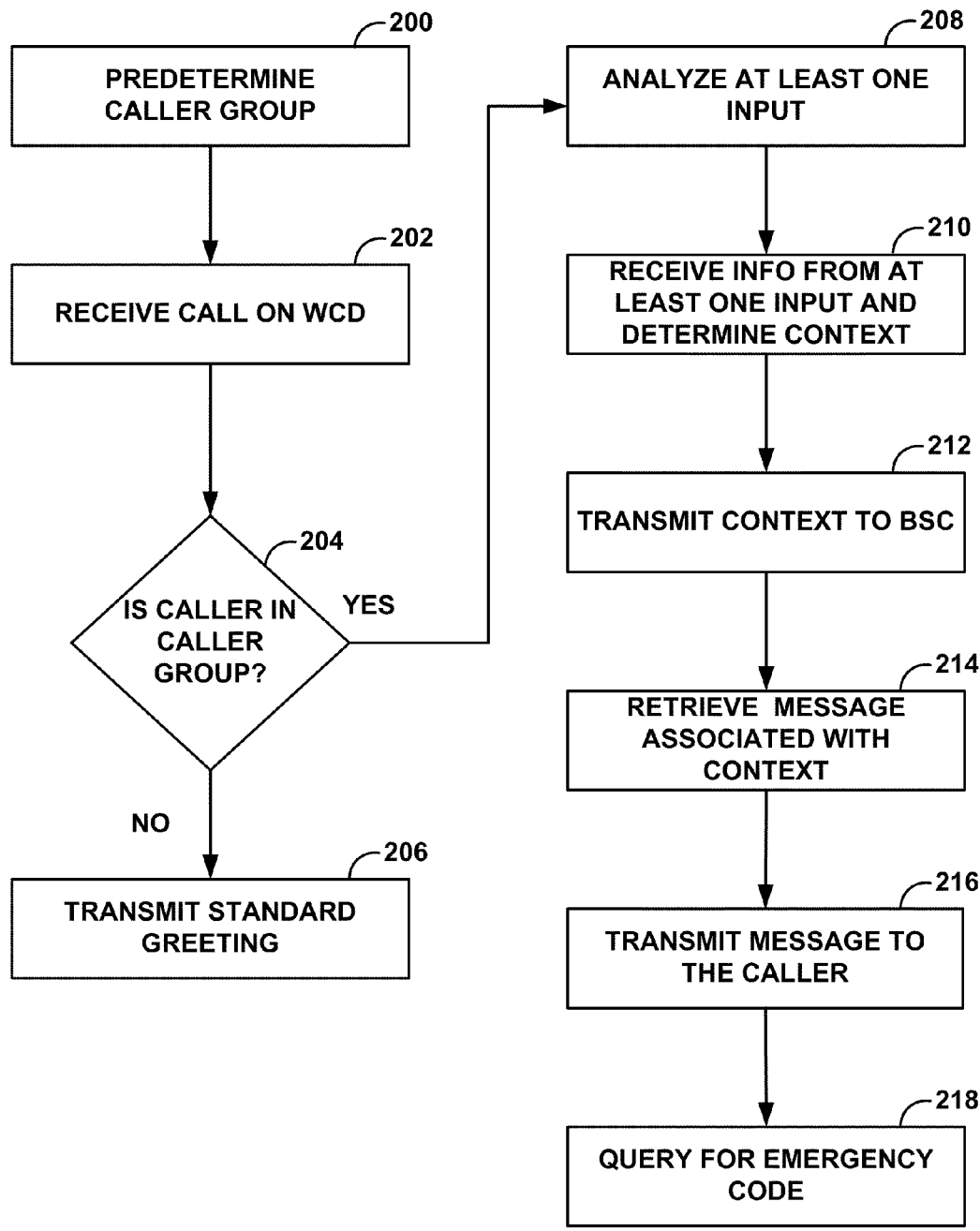
FIG. 8 is a flow diagram illustrating another reply message selection method in accordance with this disclosure.

FIG. 8 is a flow diagram illustrating another method for selecting a reply message when a wireless communication device user does not receive or answer the call, in accordance with this disclosure. In the method shown in FIG. 8, the wireless communication device user predetermines one or more caller groups (200) which a processor prepares and stores in caller ID data 48. The caller group includes a person or select group of people to whom the user would like to provide specific information about the user's wireless communication device. After receiving a call on the wireless communication device (202), a processor determines whether the caller is in the caller group (204) by accessing caller ID data 48. As mentioned above, if the caller does not belong to the caller group (no branch of 204), a greeting that the user previously recorded, or a standard greeting which is not context based may be transmitted to the caller (206). However, if the caller does belong to the caller group (yes branch of 204), a processor may analyze at least one of its inputs (208). Information is received from at least one of the inputs and a context is determined (210). The wireless communication device may, for example, analyze the microphone input information data, as described above, as well as its control channel. The wireless communication device may receive information from the microphone input indicating that the device's environment is below a threshold ambient noise level indicating that the environment is relatively quiet, but the information received on the control channel via the system identification code may indicate that the device is roaming, and therefore significant charges may be charged if the user answers the call. WCD 20 may then transmit the context to BSC 14 (212). A processor in communication with BSC 14 then accesses message selection data 46 in VMS 18 and selects the greeting associated with the context. The processor then retrieves the message data 42, 44 associated with the context (214) and the message is transmitted to the caller (216).

Still referring to FIG. 8, some examples of the disclosure include the ability to query for an emergency code (218). Entering an emergency code may allow the caller to bypass the portion of the voicemail messaging system that records a message for the wireless communication device user and continue calling the wireless communication device without redialing. It should be noted that although the emergency code step has only been shown with respect to FIG. 8, it may be used with any of the examples described in this disclosure, and is not limited to the example shown in FIG. 8. Further, while the step of entering an emergency code is shown in FIG. 8 after the step of transmitting the voicemail greeting, it may instead occur before transmission. Further still, in some examples, the emergency code feature may or may not be combined with the caller group feature. That is, in one example, only callers in the predetermined caller group will be prompted to enter an emergency code. However, in at least one example, any caller may be able enter an emergency code, whether or not the caller is in the predetermined caller group.

Figure 9:
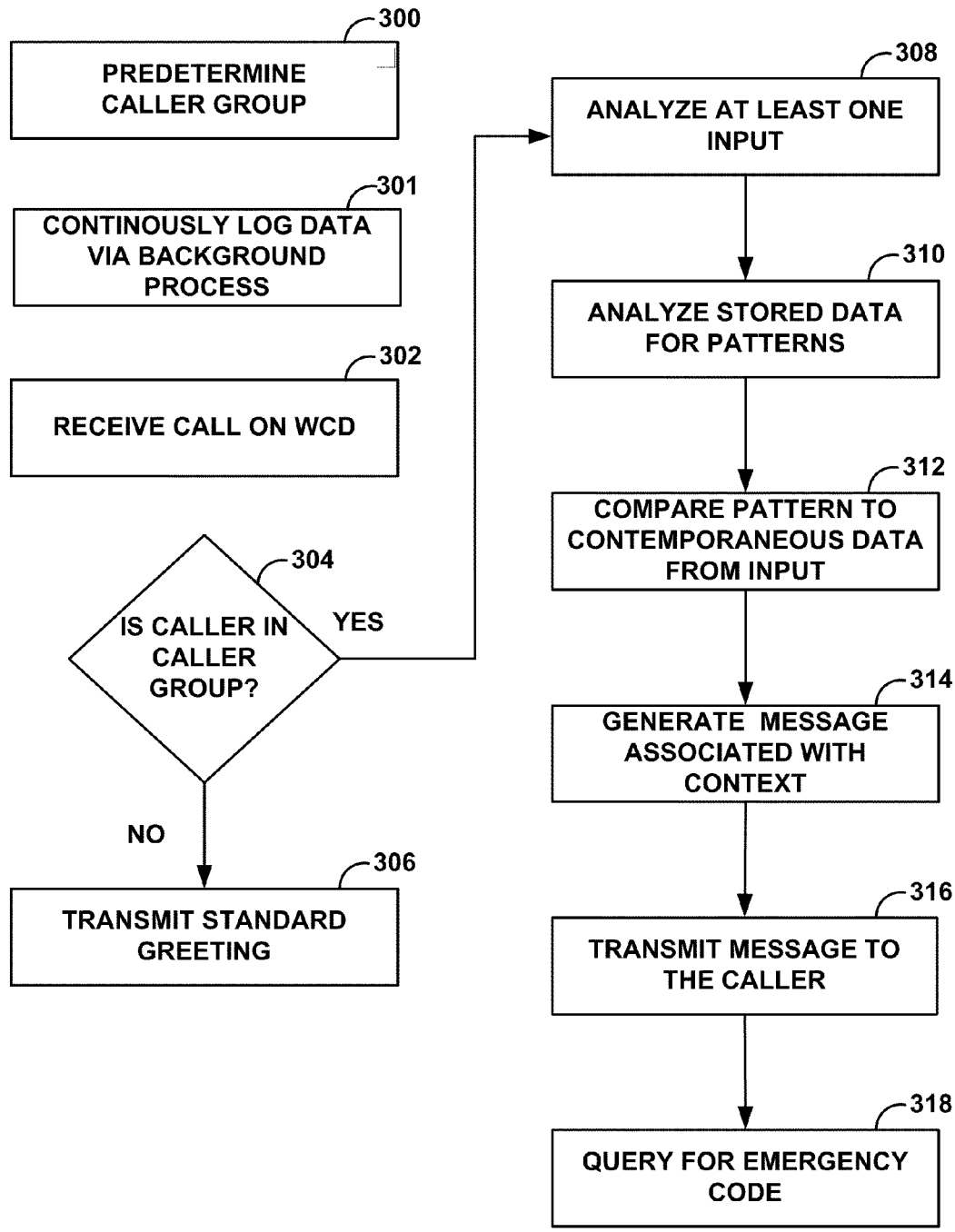
FIG. 9 is a flow diagram illustrating another reply message selection method in accordance with this disclosure.

FIG. 9 is a flow diagram illustrating another method for selecting a reply message when a wireless communication device user does not receive or answer the call, in accordance with this disclosure. In the method shown in FIG. 8, the wireless communication device user predetermines one or more caller groups (300) which a processor prepares and stores in caller ID data 48. The caller group includes a person or select group of people to whom the user would like to provide specific information about the user's wireless communication device. In some examples, data related to all applications being executed may be logged by a continuously running background process, regardless of whether the application has been flagged (301). After receiving a call on the wireless communication device (302), a processor determines whether the caller is in the caller group (304) by accessing caller ID data 48. As mentioned above, if the caller does not belong to the caller group (no branch of 304), a greeting that the user previously recorded, or a standard greeting which is not context based may be transmitted to the caller (206). However, if the caller does belong to the caller group (yes branch of 304), a processor may analyze at least one of its inputs (308). The wireless communication device may, for example, analyze the GPS data 34E received, or any flagged software applications, as described above. Or, the wireless communication device may analyze the information that had previously been logged during the continuously running background process. Information is received from at least one of the inputs, and then processor 24 analyzes stored data 52 in memory 26 using statistical modeling techniques or pattern recognition techniques in order to determine to infer user behavior or in order to determine one or more patterns (310). For example, processor 24 may determine that, although an application is not flagged, 99% of the time the user is using that application, the user does not answer a call. Or, in another example, processor 24 may determine that on Tuesdays the user always arrives home within 30 minutes of departing from "work." Processor 24 of WCD 20 may then determine that it is Tuesday and, from the contemporaneous GPS data being received by the GPS receiver, that the wireless communication device user just left "work." After comparing the analyzed pattern and the contemporaneous data from inputs 33 (312), processor 24 may determine that the user just departed from "work," and as such will likely arrive home within 30 minutes. In response to the caller, WCD 20, BSC 14, or MSC 12 may generate a message (314) that states, for example, "The user has just left work, but will likely be home in about 30 minutes. The user will return your call at that time." WCD 20, BSC 14, or MSC 12 may then transmit the message to the caller (316). And, as described above with respect to FIG. 8, some examples of the disclosure include the ability to query for an emergency code (318). Entering an emergency code may allow the caller to bypass the portion of the voicemail messaging system that records a message for the wireless communication device user and continue calling the wireless communication device without redialing.

Of course, the present disclosure is not intended to be limited to only the inputs, combinations of inputs, and the example greetings that were described above. Rather, there are numerous inputs, combinations of inputs, and possible greetings that have not been described, but are nevertheless considered to be part of the disclosure.

The present disclosure includes wireless communication devices such as cellular phones, wireless communication device handsets, as well as cordless landline phones. Landline phones may include any number of the sensors, systems utilities, etc. described in this disclosure which may be used to provide a caller with a context-based response to their call.

The techniques described in this disclosure may provide a caller with a specific reason why a user was not able to answer the phone. The techniques described in this disclosure may also provide a caller with an estimate on when the call will be returned. The techniques described in this disclosure may provide a caller with a specific reason why a user was not able to answer the phone and an estimate on when the call will be returned. The techniques described in this disclosure may also provide the caller with a text message, graphic message, or an auto message after the caller has left a voicemail for the user.

The techniques described in this disclosure may promote efficient communication. For example, by leveraging information available to it through its inputs and using the input to select a context-specific voicemail greeting, a wireless communication device may be able to provide a caller with a specific reason why the user was not able to answer the phone. Further, by leveraging information available to it through its inputs and associating the input with a specific voicemail greeting, a wireless communication device may be able to provide a caller with a more accurate estimate on when the call will be returned.

The techniques described in this disclosure may be implemented in hardware, software, firmware, or any combination thereof. In particular, the techniques may be implemented in a hardware device, such as a wireless communication device or network device, either of which may include software and/or firmware to support the implementation. For portions implemented in software, the techniques may be realized in part by a computer-readable medium comprising program code containing instructions that, when executed, performs one or more of the methods described above. In this case, the computer readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

The program code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. In this sense, the techniques are implemented in hardware, whether implemented entirely in hardware or in hardware such as a processor executing computer-readable code.

The code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein.

In some cases, the devices described in this disclosure may be formed at least in part as one or more integrated circuit devices, which may be referred to collectively as an integrated circuit device. Also, in some cases, a device as described in this disclosure may form part of a wireless communication device handset.

Many examples of the disclosure have been described. These and other examples are within the scope of the following claims. Various modifications may be made without departing from the scope of the claims.

The invention claimed is:

1. A method comprising:
    detecting a call directed to a wireless communication device from a caller;
    generating one of a plurality of reply messages for the caller based on a context of the wireless communication device derived from input information received by at least one input of the wireless communication device, the input selected from the group of inputs consisting of a camera, ambient light detector, microphone, accelerometer, thermometer, compass, barometric pressure, proximity derived from a proximity sensor, pressure derived from a pressure sensitive display, pressure derived from a pressure sensitive skin, one or more running software applications, global positioning system (GPS) data, control channel data, a list of calls placed from the wireless communication device, remaining minutes on calling plan of a user of the wireless communication device, clock data, network signal strength, battery charge level, short range wireless interface, headphone connection, and communication error rate; and
    transmitting the generated reply message to the caller.

2. The method of claim 1, wherein the input information is received based on the detected call.

3. The method of claim 1, wherein generating one of a plurality of reply messages for the caller based on a context of the wireless communication device further comprises:
    analyzing the information received by at least one input of the wireless communication device;
    determining the context based on the information received;
    retrieving from a memory device in communication with a voicemail messaging system message selection data associated with the context; and
    selecting from the memory device the message data associated with the message selection data, wherein the message data is stored on the voicemail messaging system.

4. The method of claim 3, wherein analyzing the information received from at least one input of the wireless communication device is performed by the wireless communication device.

5. The method of claim 3, wherein determining a context based on the information received is performed by the wireless communication device.

6. The method of claim 3, wherein retrieving from a memory device in communication with a voicemail messaging system message selection data associated with the context is performed by the wireless communication device.

7. The method of claim 3, wherein selecting from the memory device the message data associated with the message selection data is performed by the wireless communication device.

8. The method of claim 3, wherein the voicemail messaging system is located within the wireless communication device.

9. The method of claim 1, wherein the wireless communication device is a wireless communication device handset.

10. The method of claim 1, further comprising:
    querying for an emergency code, wherein the emergency code allows the caller to bypass recording a message for a user of the wireless communication device and continue calling the wireless communication device without redialing.

11. The method of claim 1, wherein generating one of a plurality of reply messages for the caller based on a context of the wireless communication device derived from input information received by at least one input of the wireless communication device comprises:
- flagging at least one application;
- storing data related to the at least one application during execution of the application;
- analyzing the stored data to recognize at least one pattern; and
- comparing the pattern to contemporaneous data generated during execution of the application.

12. The method of claim 1, wherein generating one of a plurality of reply messages for the caller based on a context of the wireless communication device derived from input information received by at least one input of the wireless communication device comprises:
- executing a background process that continuously stores data related to the at least one application during execution of the application;
- analyzing the stored data to recognize at least one pattern; and
- comparing the pattern to contemporaneous data generated during execution of the application.

13. The method of claim 1, wherein the input information is received automatically.

14. A wireless communication system comprising:
- a wireless communication device having an input interface that generates input information indicating a context of the wireless communication device, the input interface configured to receive at least one input selected from the group of inputs consisting of a camera, ambient light detector, microphone, accelerometer, thermometer, compass, barometric pressure, proximity derived from a proximity sensor, pressure derived from a pressure sensitive display, pressure derived from a pressure sensitive skin, one or more running software applications, global positioning system (GPS) data, control channel data, a list of calls placed from the wireless communication device, remaining minutes on calling plan of a user of the wireless communication device, clock data, network signal strength, battery charge level, short range wireless interface, headphone connection, and communication error rate;
- a processor that detects a call directed to the wireless communication device from a caller, and generates one of a plurality of reply messages for the caller based on the context of the wireless communication device; and
- a transmitter that transmits the generated reply message to the caller.

15. The communication system of claim 14, wherein the processor resides within the wireless communication device.

16. The communication system of claim 14, wherein the processor resides within a wireless communication system device.

17. The communication system of claim 14, wherein the input interface is configured to receive the at least one input based on the detected call.

18. The communication system of claim 14, wherein the wireless communication device is a wireless communication device handset.

19. The communication system of claim 14, wherein the processor queries for an emergency code, wherein the emergency code allows the caller to bypass recording a message for a user of the wireless communication device and continue calling the user without redialing.

20. The communication system of claim 14, wherein the processor executes instructions that store data related to the at least one flagged application during execution of the application, and wherein the processor executes instructions that analyze the stored data to recognize at least one pattern, and wherein the processor executes instructions that compare the pattern to contemporaneous data generated during execution of the application.

21. The system of claim 14, wherein the input information is generated automatically.

22. A wireless communication device comprising:
- an input interface that generates input information indicating a context of the wireless communication device, the input interface configured to generate the input information from one or more inputs selected from the group of inputs consisting of a camera, ambient light detector, microphone, accelerometer, thermometer, compass, barometric pressure, proximity derived from a proximity sensor, pressure derived from a pressure sensitive display, pressure derived from a pressure sensitive skin, one or more running software applications, global positioning system (GPS) data, control channel data, a list calls placed from the wireless communication device, remaining minutes on a user's calling plan, clock data, network signal strength, battery charge level, short range wireless interface, headphone connection, and communication error rate; and
- a processor that detects a call directed to the wireless communication device from a caller, and generates an indication for generation of one of a plurality of reply messages for the caller based on the context of the wireless communication device.

23. The device of claim 22, wherein the processor generates the message, and wherein the processor transmits the message to the caller.

24. The device of claim 22, wherein the processor transmits the indication to a wireless communication system device for generation of the message.

25. The device of claim 22, wherein the input interface is configured to receive the one or more inputs based on the detected call.

26. The device of claim 22, wherein the device is a wireless communication device handset.

27. The device of claim 22, wherein the processor executes instructions that store data related to the at least one flagged application during execution of the application, and wherein the processor executes instructions that analyze the stored data to recognize at least one pattern, and wherein the processor executes instructions that compare the pattern to contemporaneous data generated during execution of the application.

28. The device of claim 22, wherein the processor executes instructions that continuously store data related to the at least one application during execution of the application, and wherein the processor executes instructions that analyze the stored data to recognize at least one pattern, and wherein the processor executes instructions that compare the pattern to contemporaneous data generated during execution of the application.

29. The device of claim 22, wherein the input information is generated automatically.

30. A computer-readable medium comprising instructions that cause a processor within a wireless communication system device to:
- detect a call directed to a wireless communication device from a caller;
- generate one of a plurality of reply messages for the caller based on a context of the wireless communication device derived from input information received by at least one input of the wireless communication device, the input selected from the group of inputs consisting of a camera, ambient light detector, microphone, accelerometer, thermometer, compass, barometric pressure, proximity derived from a proximity sensor, pressure derived from a pressure sensitive display, pressure derived from a pressure sensitive skin, one or more running software applications, global positioning system (GPS) data, control channel data, a list of calls placed from the wireless communication device, remaining minutes on calling plan of a user of the wireless communication device, clock data, network signal strength, battery charge level, short range wireless interface, headphone connection, and communication error rate; and transmit the generated reply message to the caller.

31. The computer-readable medium of claim 30, further comprising instructions to cause the processor to:
analyze the input information received by at least one input of the wireless communication device;
determine a context based on the information received;
retrieve from a memory device message selection data associated with the context; and
select from the memory device the message data associated with the message selection data.

32. The computer-readable medium of claim 30, wherein the input information is received based on the detected call.

33. The computer-readable medium of claim 30, wherein the wireless communication device is a wireless communication device handset.

34. The computer-readable medium of claim 30, further comprising instructions to cause the processor to:
query for an emergency code, wherein the emergency code allows the caller to bypass recording a message for a user of the wireless communication device and continue calling the wireless communication device without redialing.

35. The computer-readable medium of claim 30, further comprising instructions to cause the processor to:
execute instructions that store data related to the at least one flagged application during execution of the application;
analyze the stored data to recognize at least one pattern; and
compare the pattern to contemporaneous data generated during execution of the application.

36. The computer-readable medium of claim 30, further comprising instructions to cause the processor to:
execute a background process that continuously stores data related to the at least one application during execution of the application;
analyze the stored data to recognize at least one pattern; and
compare the pattern to contemporaneous data generated during execution of the application.

37. The computer-readable medium of claim 30, wherein the input information is received automatically.

38. A wireless communication system comprising:
means for detecting a call directed to a wireless communication device from a caller;
means for generating one of a plurality of reply messages for the caller based on a context of the wireless communication device derived from input information received by at least one input of the wireless communication device, the input selected from the group of inputs consisting of a camera, ambient light detector, microphone, accelerometer, thermometer, compass, barometric pressure, proximity derived from a proximity sensor, pressure derived from a pressure sensitive display, pressure derived from a pressure sensitive skin, one or more running software applications, global positioning system (GPS) data, control channel data, a list of calls placed from the wireless communication device, remaining minutes on calling plan of a user of the wireless communication device, clock data, network signal strength, battery charge level, short range wireless interface, headphone connection, and communication error rate; and means for transmitting the generated reply message to the caller.

39. The system of claim 38, wherein the input information is received based on the detected call.

40. The system of claim 38, wherein generating one of a plurality of reply messages for the caller based on a context of the wireless communication device further comprises:
means for analyzing the information received by at least one input of the wireless communication device;
means for determining a context based on the information received;
means for retrieving from a memory device in communication with a voicemail messaging system message selection data associated with the context; and
means for selecting from the memory device the message data associated with the message selection data, wherein the message data is stored on the voicemail messaging system.

41. The system of claim 40, wherein the means for analyzing the information received from at least one input of the wireless communication device is performed by the wireless communication device.

42. The system of claim 40, wherein the means for determining a context based on the information received is performed by the wireless communication device.

43. The system of claim 40, wherein the means for retrieving from a memory device in communication with a voicemail messaging system message selection data associated with the context is performed by the wireless communication device.

44. The system of claim 40, wherein the means for selecting from the memory device the message data associated with the message selection data, wherein the message data is stored on the voicemail messaging system is performed by the wireless communication device.

45. The system of claim 40, wherein the voicemail messaging system is located within the wireless communication device.

46. The system of claim 38, wherein the wireless communication device is a wireless communication device handset.

47. The system of claim 38, further comprising:
means for querying for an emergency code, wherein the emergency code allows the caller to bypass recording a message for the wireless communication device user and continue calling the user without redialing.

48. The system of claim 38, further comprising:
means for flagging at least one application;
means for storing data related to the at least one application during execution of the application;
means for analyzing the stored data to recognize at least one pattern; and
means for comparing the pattern to contemporaneous data generated during execution of the application.

49. The system of claim 38, further comprising:
means for executing a background process that continuously stores data related to the at least one application during execution of the application;

means for analyzing the stored data to recognize at least one pattern; and means for comparing the pattern to contemporaneous data generated during execution of the application.

50. The system of claim 38, wherein the input information is received automatically.

51. A method comprising:

detecting a call directed to a wireless communication device from a caller;

generating one of a plurality of reply messages for the caller based on a context of the wireless communication device derived from input information received by at least one input of the wireless communication device, the generating including:

analyzing the information received by at least one input of the wireless communication device;

determining the context based on the information received;

retrieving from a memory device in communication with a voicemail messaging system message selection data associated with the context; and selecting from the memory device the message data associated with the message selection data, wherein the message data is stored on the voicemail messaging system; and transmitting the generated reply message to the caller.

52. A wireless communication device comprising:

an input interface configured to generate input information indicating a context of the wireless communication device, the generating including:

analyzing the information received by at least one input of the wireless communication device;

determining the context based on the information received;

retrieving from a memory device in communication with a voicemail messaging system message selection data associated with the context; and selecting from the memory device the message data associated with the message selection data, wherein the message data is stored on the voicemail messaging system; and a processor that detects a call directed to the wireless communication device from a caller, and generates an indication for generation of one of a plurality of reply messages for the caller based on the context of the wireless communication device.

53. A wireless communication system comprising:

means for detecting a call directed to a wireless communication device from a caller;

means for generating one of a plurality of reply messages for the caller based on a context of the wireless communication device derived from input information received by at least one input of the wireless communication device, the means for generating configured to:

analyze the information received by at least one input of the wireless communication device;

determine the context based on the information received;

retrieve from a memory device in communication with a voicemail messaging system message selection data associated with the context; and select from the memory device the message data associated with the message selection data, wherein the message data is stored on the voicemail messaging system; and means for transmitting the generated reply message to the caller.

* * * * *